(12) United States Patent
Bisaria et al.

(10) Patent No.: US 6,379,795 B1
(45) Date of Patent: Apr. 30, 2002

(54) INJECTION MOLDABLE CONDUCTIVE AROMATIC THERMOPLASTIC LIQUID CRYSTALLINE POLYMERIC COMPOSITIONS

(75) Inventors: Mukesh K. Bisaria, Kingston; Peter Andrin, Napanee; Mohamed Abdou; Yuqi Cai, both of Kingston, all of (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/479,712

(22) Filed: Jan. 7, 2000

Related U.S. Application Data

(60) Provisional application No. 60/116,410, filed on Jan. 19, 1999, and provisional application No. 60/125,342, filed on Mar. 19, 1999.

(51) Int. Cl.$^7$ .............................. D02G 3/00; B29N 3/10; H01M 8/64

(52) U.S. Cl. ...................... 428/378; 428/367; 428/375; 428/379; 428/389; 428/359; 264/257; 264/328.17; 264/328.18; 429/34

(58) Field of Search .................................. 428/357, 359, 428/361, 367, 375, 378, 379, 389, 381, 383; 264/257, 328.1, 328.17, 328.18; 429/34

(56) References Cited

U.S. PATENT DOCUMENTS

| | | |
|---|---|---|
| 3,801,374 A | 4/1974 | Dews et al. |
| 3,945,844 A | 3/1976 | Nickols, Jr. |
| 3,991,013 A | 11/1976 | Pletcher |
| 3,991,014 A | 11/1976 | Kleinschuster |
| 4,011,199 A | 3/1977 | McFarlane et al. |
| 4,048,148 A | 9/1977 | Morgan |
| 4,075,262 A | 2/1978 | Schaefgen |
| 4,083,829 A | 4/1978 | Calundann et al. |
| 4,098,967 A | 7/1978 | Biddick et al. |
| 4,118,372 A | 10/1978 | Schaefgen |
| 4,122,070 A | 10/1978 | Morgan |
| 4,130,545 A | 12/1978 | Calundann |
| 4,153,779 A | 5/1979 | Jackson, Jr. et al. |
| 4,159,365 A | 6/1979 | Payet |
| 4,161,470 A | 7/1979 | Calundann |
| 4,169,933 A | 10/1979 | Jackson, Jr. et al. |
| 4,184,996 A | 1/1980 | Calundann |
| 4,189,549 A | 2/1980 | Matsunaga et al. |
| 4,214,969 A | 7/1980 | Lawerance |
| 4,219,461 A | 8/1980 | Calundann |

(List continued on next page.)

FOREIGN PATENT DOCUMENTS

| | | |
|---|---|---|
| JP | 00017179 A | 1/2000 |
| WO | WO 00/30202 | 5/2000 |
| WO | WO 00/30203 | 5/2000 |
| WO | WO 00/44005 | 7/2000 |

OTHER PUBLICATIONS

Ullmann, Encyclopedia of Industrial Chemistry, *Encyclopedia*, 12A, 5$^{th}$ ed., 55ff, 1989.

Kiesche, Conductive Compositives Find their Niche, *Plastic Technology*, 77ff, 1985.

Murphy et al., Metal Coated Graphite Fiber Structural Foam Composites, *14$^{th}$Annual Structural Foam Conference and Parts Competition*, Society of the Plastics Industry, Journal, 86ff, 1986.

International Encyclopedia of Composites, *Encyclopedia*, S, Lee ed, 474ff, 1990.

Graphite Fiber Composites(Electrochemical Processing), J. Iroh in Polymeric Materials *Encyclopedia*, J.C. Salamone ed., 2861ff, 1996.

Primary Examiner—Cynthia H. Kelly
Assistant Examiner—J. M. Gray

(57) ABSTRACT

A method for making a shaped article or a shaped article having a volume resistivity of less than $10^2$ ohm-cm with a desired combination of properties and processibility in an injection moldable composition. In particular the shaped articles formed include injection molded bipolar plates as current collectors in fuel cell applications.

23 Claims, 2 Drawing Sheets

U.S. PATENT DOCUMENTS

| | | |
|---|---|---|
| 4,232,143 A | 11/1980 | Irwin |
| 4,232,144 A | 11/1980 | Irwin |
| 4,245,082 A | 1/1981 | Irwin |
| 4,256,624 A | 3/1981 | Calundann |
| 4,269,964 A | 5/1981 | Freitag et al. |
| 4,272,625 A | 6/1981 | McIntyre et al. |
| 4,339,322 A | 7/1982 | Balko et al. |
| 4,370,466 A | 1/1983 | Siemionko |
| 4,383,105 A | 5/1983 | Irwin |
| 4,447,592 A | 5/1984 | Harris, Jr. |
| 4,522,974 A | 6/1985 | Calundann et al. |
| 4,554,063 A | 11/1985 | Braun et al. |
| 4,617,369 A | 10/1986 | Huynh-Ba |
| 4,661,403 A * | 4/1987 | Morin ................. 428/367 |
| 4,664,972 A | 5/1987 | Connolly |
| 4,684,712 A | 8/1987 | Ueno |
| 4,727,129 A | 2/1988 | Hisgen et al. |
| 4,727,131 A | 2/1988 | Kock et al. |
| 4,728,714 A | 3/1988 | Hisgen et al. |
| 4,749,769 A | 6/1988 | Kock et al. |
| 4,752,415 A * | 6/1988 | Iwaskow et al. ........... 252/511 |
| 4,762,907 A | 8/1988 | Kock |
| 4,778,927 A | 10/1988 | Kock |
| 4,816,555 A | 3/1989 | Hisgen et al. |
| 4,818,615 A * | 4/1989 | Luxon et al. ............ 428/407 |
| 4,849,499 A | 7/1989 | Fegerburg et al. |
| 4,851,496 A | 7/1989 | Poll et al. |
| 4,851,497 A | 7/1989 | Wakui et al. |
| 4,857,626 A | 8/1989 | Kishiro et al. |
| 4,864,013 A | 9/1989 | Kageyama et al. |
| 4,868,278 A | 9/1989 | MacDonald et al. |
| 4,882,089 A * | 11/1989 | Iwaskow et al. ........... 428/242 |
| 4,882,410 A | 11/1989 | Neugebaur et al. |
| 4,909,910 A * | 3/1990 | Morin ................. 204/28 |
| 4,923,947 A | 5/1990 | Coassolo et al. |
| 4,944,965 A * | 7/1990 | Luxon et al. ............ 427/389.7 |
| 4,952,448 A * | 8/1990 | Bullock et al. ............ 428/323 |
| 4,983,456 A * | 1/1991 | Iwaskow et al. ........... 428/254 |
| 4,999,416 A | 3/1991 | Kaminade et al. |
| 5,015,721 A | 5/1991 | Gabrielli et al. |
| 5,015,722 A | 5/1991 | Charbonneau et al. |
| 5,086,158 A | 2/1992 | Hayashi et al. |
| 5,091,255 A * | 2/1992 | Hsu et al. ................. 428/378 |
| 5,102,935 A | 4/1992 | Heinz et al. |
| 5,110,896 A | 5/1992 | Waggoner et al. |
| 5,143,956 A | 9/1992 | Pielartzik et al. |
| 5,294,654 A * | 3/1994 | Hellstern-Burnell et al. ..... 524/127 |
| 5,582,622 A | 12/1996 | Lafollette |
| 6,180,275 B1 * | 1/2001 | Braun et al. ............ 429/34 |

\* cited by examiner

INJECTION MOLDABLE CONDUCTIVE AROMATIC THERMOPLASTIC LIQUID CRYSTALLINE POLYMERIC COMPOSITIONS

This application claims benefit of Provisional Application No. 60/116,410 filed Jan. 19, 1999 and Provisional Application No. 60/125,342 filed Mar. 19, 1999 both abandoned.

FIELD OF INVENTION

The present invention relates to an injection moldable electrically conductive composition comprising aromatic thermoplastic liquid crystalline polymers (LCPs), electrically conductive articles made therefrom, and the injection molding process for making them. The compositions of the invention are useful in a wide variety of applications including electrochemical devices such as battery current collectors, high efficiency electromagnetic/radio frequency interference shielding, and electrostatic dissipative packaging and equipment housings. The present invention is particularly useful in fuel cells.

BACKGROUND OF THE INVENTION

In the current state of the art, a typical fuel cell comprises the elements shown in FIG. 1. A membrane/electrode assembly (MEA), 10, comprising a membrane separator, 11, and catalyst coatings, 12, on either side thereof, and two (2) gas difflusion backing sheets, 20, are sealed by gaskets, 30, between two (2) electronically conductive graphite plates, 40. The plates often serve a multiple role as current collectors conveying electrons to the external load via electrical connections not shown, as mechanical supports for the other fuel cell components, and as gas and water distribution networks via a pattern of flow fields inscribed upon the surfaces thereof, 50. Gas and water inputs and outputs are generally integral with the graphite plate, but are not shown. The graphite plates normally serve as the interface between adjacent cells in a stack. The plates are known variously as current collectors, flow fields, and bipolar (or monopolar) plates. For further information, see, for example, Ullmann's Encyclopedia of Industrial Chemistry, 5$^{th}$ ed. Vol. 12A, pp. 55ff, VCH, New York, 1989.

Because of its multiple role, the bipolar plate has a number of requirements to meet. The plate must have good electrical conductivity, good mechanical or structural properties and high chemical stability in the chemically reactive fuel cell environment. In addition because of its gas distribution role it must be made of a gas impermeable material and be formed with complex gas delivery channels across its surface.

In the current practice of the art, graphite is the material of choice for bipolar plates because of its high electrical conductivity, high strength and immunity to corrosion. However, it is brittle, expensive, and requires expensive machining to produce. The brittleness of graphite necessitates its use in ca. six (6) mm thick slabs which adds both weight and bulk to the fuel cell, thus driving down its power density (kW/l or kW/kg) in use.

Carbon/graphite filled thermoplastic polymers have long been identified as a promising alternative to graphite in bipolar plates. In principle, conductive, reinforced thermoplastic polymer compositions can be molded directly into complex, intricate shaped components using low cost, high-speed molding processes. In addition, these more ductile materials will enable the development of new stack designs because moldable plastics offer much greater flexibility to the form of fuel cell components. Unfortunately, this potential has not been realized in the art despite numerous attempts to do so.

Electrically conductive thermoplastic polymer compositions providing volume resistivities of $10^{-3}$–$10^{-2}$ ohm-cm are known in the art, and are of particular interest in the production of fuel cell current collectors.

U.S. Pat. No. 3,945,844 to Nickols discloses polymer/metal composites. Polysulfone, polyphenylene sulfide, polyphenylene oxide, acrylonitrilebutadiene-styrene copolymer are combined in a variety of ways with stainless steel, silver, gold, and nickel. The amount of either metal powders or fillers or both, in the polymer/metal composite varies from 50 to 80 weight % percent. Resistivity levels as low as $10^{-3}$ ohm-cm are reported.

U.S. Pat. No. 4,098,967 to Biddick et al. provides a bipolar plate formed of thermoplastic resin filled with 40–80% by volume finely divided vitreous carbon. Plastics employed in the compositions include polyvinylidene fluoride and polyphenylene oxide. The plates are formed by compression molding dryblended compositions and possess specific resistance on the order of 0.002 ohm-cm. Compression molded bipolar plates from solution blends of graphite powder and polyvinylidene fluoride are disclosed in U.S. Pat. No. 3,801,374 to Dews et al. The plate so formed has a density of 2.0 g/cc and volume resistivity of $4 \times 10^{-3}$ ohm-cm.

U.S. Pat. No. 4,214,969 to Lawrance discloses a bipolar plate fabricated by pressure molding a dry mixture carbon or graphite particles and a fluoropolymer resin. The carbon or graphite are present in a weight ratio to the polymer of between 2.5:1 and 16:1. For polymer concentrations in the range of 6–28% by weight, volume resistivity is in the range of $1.2$–$3.5 \times 10^{-3}$ ohm-in.

In U.S. Pat. No. 4,339,322 to Balko et al., the physical strength of the compression molded composite of U.S. Pat. No. 4,214,969 was improved by substituting carbon fibers or other fibrous carbon structures for some of the graphite powder. Typical composition includes 20% (by weight) polyvinylidene fluoride (PVDF), 16% (by weight) carbon fiber, and graphite powder. The dry mixture was blended, then pressure molded into plates. The volume resistivity is in the range of $1.9 \times 10^{-3}$ to $3.9 \ 10^{-3}$ ohm-in at a binder/resin loading levels of 7–26 wt %.

U.S. Pat. No. 4,554,063-85 to Braun et al. discloses a process for fabricating cathode current collectors. The current collector consists of graphite (synthetic) powder of high purity, having particle sizes in the range from 10 (micron) to 200 (micron) and carbon fibers which are irregularly distributed therein and have lengths from 1 mm to 30 mm, the graphite powder/carbon fiber mass ratio being in the range from 10:1 to 30:1. The binder/resin used is polyvinylidene fluoride. For producing the current collector, the binder is dissolved in, for example, dimethylformamide. Graphite powder and carbon fibers are then added and the resulting lubricating grease-like mass is brought to the desired thickness by spreading on a glass plate and is dried for about 1 hour at about 50° C. The plates were also formed by casting, spreading, and extrusion.

U.S. Pat. No. 5,582,622 to Lafollette discloses bipolar plates comprising a composite of long carbon fibers, a filler of carbon particles and a fluoroelastomer.

Also known in the art is the use of metal-coated, particularly nickel-coated chopped graphite fibers to form conductive polymer compositions. In order to reduce fiber attrition by compounding, the prior art discloses employing a thermoplastic resin-impregnated bundle of nickel-coated graphite fibers which are directly injection moldable with a thermoplastic matrix resin with only a preliminary dry-blending step. See for example Kiesche, "Conductive Composites Find Their Niche," Plastics Technology, November 1985, P. 77ff; Murthy et al, "Metal Coated Graphite Fiber Structural Foam Composites," Fourteenth Annual Structural Foam Conference and Parts Competition, The Society of the Plastics Industry, Inc., April 1986, PP 86ff. Use of wider gates and flow channels in molding machines processing graphite fibers is disclosed for example in International Encyclopedia of Composites, S. Lee, ed. pp 474ff, VCH publishers, 1990. Also disclosed therein is the enhancement of conductivity realized by orientation of high aspect ratio conductive fibers in the polymer matrix during the molding process.

Methods for forming resin-impregnated graphite fibers which are also applicable to metal-coated graphite are known in the art. Some of these methods are disclosed in "Graphite Fiber Composites (Electrochemical Processing)" by J. Iroh in Polymeric Materials Encyclopedia, J. C. Salamone, ed., pp. 2861ff, CRC Press 1996.

The art hereinabove cited is directed to replacing pure metal or graphite components which require extensive machining to be formed into finished articles with moldable compositions based upon thermoplastic polymer resins which require less, post-molding machining to form the finished article.

The problem in realizing the advantages of molded thermoplastic polymer parts has been related to the inverse relationship between concentration of conductive filler on the one hand and processibility and mechanical properties on the other. In practice, as shown in the art hereinabove cited, quantities of conductive filler required to achieve the $10^{-2}$ ohm-cm resistivity goal in fuel cells result in products with limited practical utility. This is particularly true in regard to the formation of current collectors in fuel cell applications.

It is desirable to achieve a combination of properties and processibility in an injection moldable composition without the limitation on practical utility. Another advantage desired is the reduction in cost of forming finished articles such as current collectors in comparison to conventional methods.

SUMMARY OF THE INVENTION

Briefly stated, and in accordance with one aspect of the present invention, there is provided a process for fabricating a shaped article having a volume resistivity of less than $10^{-2}$ ohm-cm, the process comprising:

combining an injection moldable aromatic thermoplastic liquid crystalline polymer resin and a composition comprising nickel-coated graphite fibers impregnated with a non-liquid-crystalline thermoplastic binder resin, to form a mixture at a temperature below the melting point of the thermoplastic liquid crystalline polymer resin, the graphite fibers being of a length of less than 2 cm and comprising about 5 to about 50% by weight of the mixture, and the binder resin comprising about 0.1 to about 20% by weight of the graphite;

feeding the mixture to an injection molding machine wherein the thermoplastic liquid crystalline polymer resin is melted and fed in the molten state to a mold; cooling the mold to a temperature at which the thermoplastic liquid crystalline polymer in the mixture no longer flows; and,removing the molded mixture from the mold.

Pursuant to another aspect of the invention, there is provided a shaped article having a volume resistivity of less than $10^{-2}$ ohm-cm comprising about 50 to about 95% by weight of an aromatic liquid crystalline polymer about 5 to about 50% by weight of a nickel-coated graphite fiber of a length less than 2 cm, and about 0.1 to about 20% by weight with respect to the weight of the graphite fiber of a non-liquid-crystalline thermoplastic binder resin.

Pursuant to another aspect of the invention, there is provided a process for fabricating an electrically conductive shaped article, the process comprising: combining an injection moldable aromatic thermoplastic liquid crystalline polymer resin in the form of particles characterized by a mean particle size of less than 1500 micrometers with a graphite filler to form a mixture at a temperature below the melting point of the thermoplastic liquid crystalline polymer resin, the graphite filler being present in a concentration of about 5% to about 80% by weight of the total mixture; feeding the mixture to an injection molding machine wherein the aromatic thermoplastic liquid crystalline polymer resin is melted and fed in the molten state to a mold; cooling the mold to a temperature at which the resin in the mixture no longer flows; and, removing said molded mixture from the mold.

BRIEF DESCRIPTION OF THE FIGURES

Other features of the present invention will become apparent as the following description proceeds and upon reference to the Figures, in which.

DETAILED DESCRIPTION OF THE INVENTION

Figure 1:
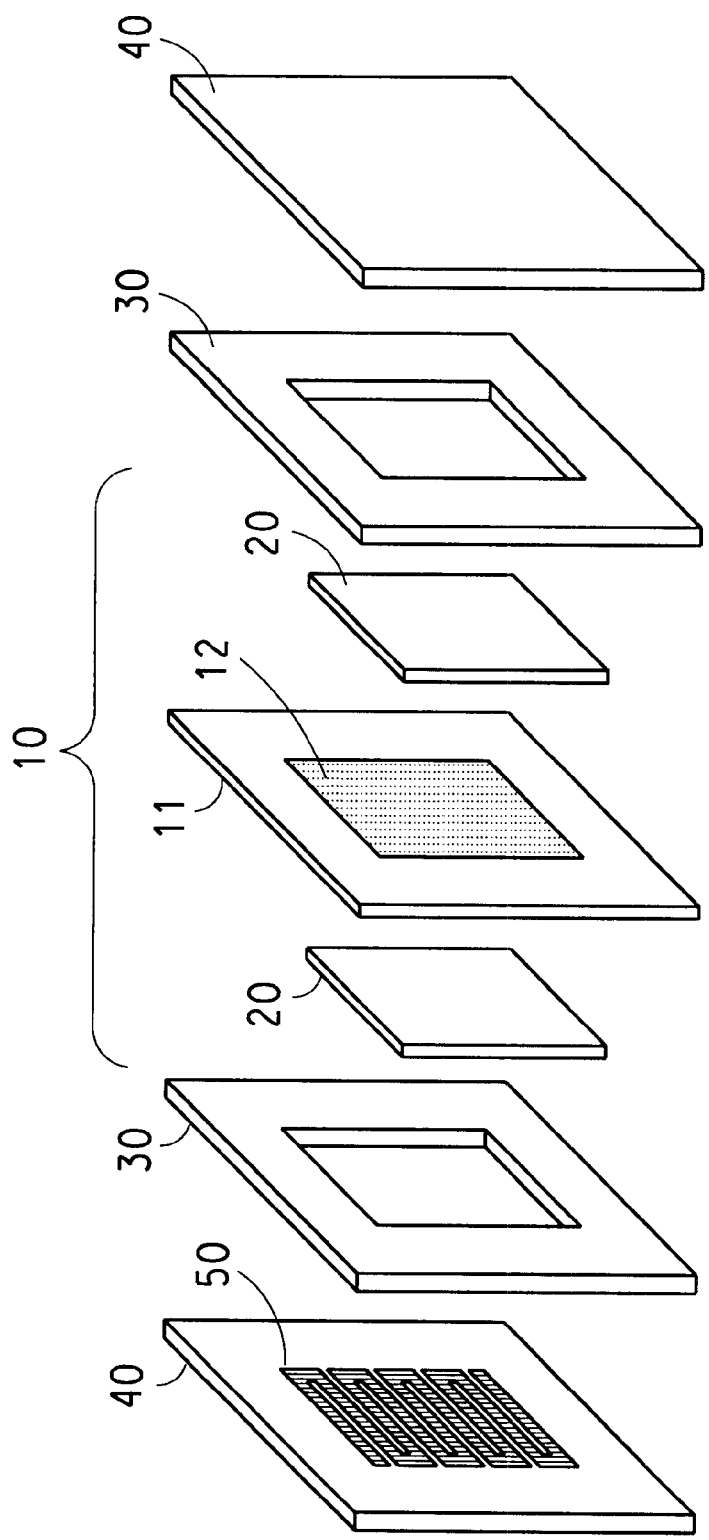
FIG. 1 is a schematic illustration of a typical fuel cell.

The compositions of the present invention provide a novel balance among conductivity, processibility, and structural properties. Surprisingly, it was found in the practice of the invention that injection molded plaques having excellent strength and stiffness can be produced with electrical volume resistivity in the range of $10^{-3}$–$10^{-2}$ ohm-cm. The plaques so formed are suitable for use as current collectors in fuel cells at thicknesses in the range of about 0.2 to about 10 mm. with a preferred thickness of 1–3 mm. The combination of properties achieved by these plaques compares favorably with the machined graphite plaques which represent the current state of the art in fuel cell development. However, the present invention provides the advantage of a significantly reduced cost in the process of forming the shaped articles.

In a preferred embodiment of the present invention, the necessary balance of properties to permit direct injection molding of complex shaped articles with excellent structural properties, processibility, and volume resistivity of $10^{-2}$ ohm-cm or less is achieved. Despite the teachings of the prior art, and the obvious economic incentive to develop injection molded current collectors to replace the current expensive method, no satisfactory injection molded current collectors have been produced prior to the present invention. It is well known in the art that processibility and structural properties deteriorate as the amount of filler incorporated into a polymeric matrix is increased. In the art as hereinabove described, in order to achieve the volume resistivity of $10^{-2}$ ohm-cm or less required for practical application to fuel cells, the requisite quantity or loading of conductive fiber and other fillers into the selected polymer matrices resulted in melt viscosities too high to permit injection molding, and such poor structural properties such as ductility, flexural strength, and impact strength that only excessively thick plaques could be employed without exhibiting structural failure in use.

The term "thermoplastic" as used herein refers to the thermoplastic liquid crystalline polymer resin suitable for the practice of the present invention that is melt processible according to conventional methods known in the art for melt processing plastics such as screw extrusion and injection molding.

In the present invention, the easy moldability of aromatic thermoplastic liquid crystalline polymers allows formation of conductive shaped articles of complex shape and thin walls and sufficient loading of conductive fillers affords excellent conductivity. The excellent chemical resistance of molded aromatic thermoplastic liquid crystalline polymers combined with the as-molded complex shapes makes the process of the present invention particularly well-suited for the fabrication of bipolar plates useful in fuel cells.

Furthermore, an embodiment of the present invention provides an injection moldable composition comprising an injection moldable aromatic thermoplastic liquid crystalline polymerthermoplastic thermoplastic liquid crystalline polymer resin, and a conductive graphite filler, which is fed to an injection molding machine wherein the aromatic thermoplastic liquid crystalline polymerthermoplastic thermoplastic liquid crystalline polymer is melted, the graphite filler is dispersed within the polymer melt so formed during the advance of the injection molding screw, and the molten resin composition is fed to a mold wherein it is solidified and then ejected as a solid shaped article.

In a preferred embodiment of the present invention, the ingredients of the composition are dry mixed prior to feeding. Dry mixing may be accomplished by any convenient means such as tumbling. Preferably, the composition also comprises a dispersing agent, and such other additives as may be desired or required to improve processibility or end-use properties.

Aromatic thermoplastic liquid crystalline polymers suitable for the practice of the present invention include those described in U.S. Pat. Nos. 3,991,013; 3,991,014; 4,011,199; 4,048,148; 4,075,262; 4,083,829; 4,118,372; 4,122,070; 4,130,545; 4,153,779; 4,159,365; 4,161,470; 4,169,933; 4,184,996; 4,189,549; 4,219,461; 4,232,143; 4,232,144; 4,245,082; 4,256,624; 4,269,964; 4,272,625; 4,370,466; 4,383,105; 4,447,592; 4,522,974; 4,617,369; 4,664,972; 4,684,712; 4,727,129; 4,727,131; 4,728,714; 4,749,769; 4,762,907; 4,778,927; 4,816,555; 4,849,499; 4,851,496; 4,851,497; 4,857,626; 4,864,013; 4,868,278; 4,882,410; 4,923,947; 4,999,416; 5,015,721; 5,015,722; 5,0254,082; 5,086,158; 5,102,935; 5,110,896; 5,143,956.

Useful aromatic thermoplastic liquid crystalline polymers include polyesters, poly(ester-amides), poly(ester-imides), and polyazomethines. Especially useful are aromatic thermoplastic liquid crystalline polymers that are polyesters or poly(ester-amides). It is also preferred in these polyesters and poly(ester-amides) that at least about 50%, more preferably about 75% of the bonds to ester or amide groups, i.e., the free bonds of —C(O)O— and —C(O)NR$^1$— where R$^1$ is hydrogen or hydrocarbyl, be to carbons atoms which are part of aromatic rings.

In a preferred embodiment of the present invention, the polyesters or poly(ester-amides) are made from monomers such as one or more aromatic dicarboxylic acid such as isophaltic acid, terephtalic acid, 4,4-bibenzoic acid, 2,6-napthalene dicarboxylic acid, one or more aromatic dihydoxy compounds such as hydroquinone, a substituted hydroquinone such as methylhydroquinone, t-butylhydroquinone, and chlorohydroquinone, resorcinol, 4,4'-biphenol, 2,6-napthalenediol, and 2,7-napthalenediol, one or more aromatic hydroxyacids such as 3-hydroxybenzoic acid, 4-hydroxybenzoic acid, and 6-hydroxy-2-napthoic acid and (in the case of poly(esteramides)) one or more aromatic diamines such as p-phneylenediamine or m-phenylenediamine.

Included within the definition herein of an aromatic thermoplastic liquid crystalline polymer is a blend of 2 or more aromatic thermoplastic liquid crystalline polymers, or a blend of an aromatic thermoplastic liquid crystalline polymer with one or more non-aromatic thermoplastic liquid crystalline polymers wherein the aromatic thermoplastic liquid crystalline polymer is the continuous phase.

In one embodiment of the present invention, an aromatic thermoplastic liquid crystalline resin is combined with a conductive, metal-coated, preferably nickel-coated, graphite fiber, formed into pellets by the adhesive action of a thermoplastic resin binder. In the process of the invention, the aromatic thermoplastic liquid crystalline resin is preferably dry mixed, as by tumbling, with the metal-coated graphite fiber pellets to form a coarse homogeneous mixture. The mixture is fed to the feed throat of an injection molding machine and the resins melt as the resin mixture is conveyed along the flights of the screw while the action of the screw causes the fibers to disperse within the aromatic thermoplastic liquid crystalline resin melt. The molten dispersion is fed to a mold in which the melt hardens to form a shaped article which is then ejected from the mold.

In a preferred embodiment of the present invention, the shaped article formed according to the process of the invention is a bipolar plate having fluid-flow channels molded into the surface thereof being suitable for use in hydrogen or direct methanol fuel cells with little or no post molding finishing required. Suitable conductive fibers are graphite fibers, preferably metal coated graphite fibers, and most preferably nickel-coated graphite fibers. The length of the graphite fibers is less than ca. 1", preferably 0.125–0.5", and the diameter is in the range of about 5 to about 40 micrometers, preferably about 5 to about 15 micrometers. While any degree of metal coating is an improvement over uncoated graphite fibers, a metal coating level of about 20% to about 70% by weight of the total weight of the metal-coated fiber plus thermoplastic resin binder is preferred while approximately 45%–60% is most preferred. Because of the combination of chemical stability, low density, excellent performance, and low cost, nickel is the preferred coating metal.

In the preferred embodiment of the present invention, nickel-coated graphite fibers are present in the composition of the invention at concentrations in the range of about 5% to about 50%, preferably about 10% to about 40% by weight.

In the preferred embodiment of the invention, the thermoplastic resin binder represents about 0.1 to about 20% by weight, preferably about 5 to about 15% by weight of the total nickel-coated graphite fiber composition prior to mixing into the composition of the invention. The most preferred polymeric binder is a low melting polyamide copolymer or terpolymer.

The following discussion is provided for the purpose of illustrating a preferred embodiment of the invention and not for limiting same. Because of limitation in both residence time and screw design in injection molding machines, it is believed that considerable benefit accrues when the time available for dispersion of the metal-coated graphite fiber in the molten resin matrix is maximized. Pursuant to that goal, it is preferable that the thermoplastic binder resin become fluid at a lower temperature than that at which the aromatic thermoplastic liquid crystalline resin melts, thus, ensuring that the dispersion of the fiber will be well-under way while the aromatic thermoplastic liquid crystalline resin is melting.

The thermoplastic binder resin may or may not be useful as a dispersing agent. Alternatively, it may be desirable to add a dispersing agent to the composition.

The thermoplastic resin binder may be deposited on to the fibers of the invention by any means known in the art including melt impregnation, solution impregnation, in-situ polymerization of dispersed monomer, and electrodeposition. No one means, known in the art, is preferred over another.

Aromatic thermoplastic liquid crystalline polymers are manufactured and commercially available as pellets ca. 0.125" in diameter. It is found surprisingly in the practice of the present invention that conductivity is improved when aromatic liquid crystalline pellets are subject to size attrition to form particles having a mean particle size of less than 1500 μm, preferably less than 1000 μm, prior to combining with a conductive graphite filler.

In a further embodiment of the present invention, an aromatic thermoplastic liquid crystalline resin having a mean particle size of less than 1500 μm, preferably less than 1000 μm, is combined with a conductive graphite filler. In the process of the present invention, the aromatic thermoplastic liquid crystalline resin is preferably dry mixed, as by tumbling, with the graphite filler to form a coarse homogeneous mixture. The mixture is fed to the feed throat of an injection molding machine and the aromatic thermoplastic liquid crystalline polymer melts as it is conveyed along the screw flights, and the action of the screw causes the filler to disperse within the aromatic thermoplastic liquid crystalline resin melt. The molten dispersion is fed to a mold in which the melt hardens to form a shaped article which is then ejected from the mold.

The conductive graphite filler is present in the composition of the invention at concentrations in the range of about 5% to 80%, preferably about 30 to 70% by weight, most preferably 30 to 50% by weight. Suitable graphite fillers include powdered graphite, such as Thermocarb® graphite powder* from Conoco, Inc., more preferably a graphite fiber, such as pitch based graphite fibers available from Conoco, Inc., still more preferably, a metal-coated graphite fiber, most preferably a nickel-coated graphite fiber such as hereinabove described.

*(It should be noted that all references to Thermocarb®, Thermocarb and any other spellings thereof are meant to refer to the commercial product known as THERMOCARB, a trademark which identifies graphite powder sold by Conoco.).

Attrition of the particle size of the aromatic thermoplastic liquid crystalline resin pellets may be accomplished according to the following procedure: A rotary cutter or grinder, such as an ABBE cutter (Model Number: 000 Laboratory Rotary Cutter serial no. 49491, Abbe Engineering Company, Brooklyn, N.Y. 11211), is equipped with a metal screen having holes 0.060 inches (0.15 cm) in diameter. A beaker is filled with aromatic thermoplastic liquid crystalline resin pellets and immersed in liquid nitrogen and held for ca. two minutes after the liquid has stopped boiling. After immersion in the liquid nitrogen, the beaker of pellets is removed and the pellets fed to the moving blades of the cutter. Frequent clearing of the cutter is necessary because only ca. 50% of the resin pellets are actually effectively cut, leaving the cutter contaminated with a buildup of warmed pellets. The residual pellets may be recycled to the cutter after further immersion in liquid nitrogen.

It is found in the practice of the invention that when pellets of nickel-coated graphite of ca. 3.2 mm in size and larger are combined with the powdered thermoplastic liquid crystalline resin of less than 1.5 mm in size, and particularly less than 1.0 mm in size, some separation of components occurs during feeding to the injection molding machine. Some loss in homogeneity within and among resulting molded parts may result. It is therefore, desirable to take additional measures to ensure that the components remain well mixed on a macroscopic scale while feeding. This may be accomplished by employing nickel-coated graphite fibers having a smaller aspect ratio so that the pellets formed therefrom may have smaller dimensions. Another method is to adapt stuffer box technology known for feeding extruders to feeding injection molding machines. Still another method is to maintain mixing even as the material is fed into the screw of the injection molding machine. These, and other methods known in the art, may be employed, alone or in combination, to maintain homogeneity in the embodiments of the invention in which a considerable size mismatch occurs in the materials being fed.

To improve the homogeneity of the dispersion of the conductive filler into the aromatic thermoplastic liquid crystalline polymer, it may be desirable to incorporate into the compositions, formed according to the process of the present invention, a dispersing aid. The dispersing aid can be of any type known in the art to be effective in enhancing the dispersibility of metal or graphite fibers in polymeric melts. The dispersing aid may be crystalline or non-crystalline, and may be normally liquid at room temperature. In the present invention, the dispersing aid is required to be immobile in the composition at room temperature. For a liquid dispersing aid, the liquid must be immobilized by adsorption or absorption onto the fiber. Suitable dispersing aids include low molecular weight species such as fatty acids, silanes, difunctional oligomers and so forth. Dispersing aids may also be polymeric in nature, such as the thermoplastic resin binder incorporated into the nickel-coated graphite fiber pellets which are preferred for use in the present invention. The choice of dispersing aid is also governed by compatibility with the matrix polymer. Compatibility is largely an empirical determination. A compatible dispersing aid is one that will cause the fiber to disperse within the polymeric matrix, whereas a non-compatible dispersing aid doesn't cause dispersion but instead causes the fiber to form isolated clumps.

The composition of the present invention may contain such other additives as may be required to improve processibility or properties. In particular, in the practice of the present invention the addition of ca. 5–20% by weight carbon black to the composition provides a desirable improvement in conductivity with relatively small degradation of processibility or structural properties. Preferred is a highly structured carbon black such as Printex XE from Degussa, Black Pearl 2000 from Cabot or Ketjenblack EC300J from Akzo Nobel.

It is important in the present invention that the ingredients be subject to as little shearing force as possible because shearing force associated with melt mixing and extrusion normally performed to form filled polymeric compositions results in degradation of the conductivity performance. Thus all steps in the process of the present invention should be performed with an eye toward keeping shear forces low.

While any means known in the art for mixing at low shear is suitable, in the practice of the present invention simple dry tumbling of the ingredients works well. In the process of the present invention, the mixture so formed is fed to a conventional injection molding machine where the polymers undergo melting, and are conveyed to the mold followed by cooling and ejection. The injection moldable composition of the invention is suitable for use on any injection molding machine which provides the limited melt shear necessary for dispersion of the fibers in the matrix polymer melt. While a wide range of mold and runner geometries may be employed, it is found advantageous to reduce the degree of shear to which the melt is subject by employing large diameter gates and runners.

For the purposes of the present invention, premixing the dry or unmelted ingredients at low shear includes simply feeding the separate ingredients directly to the feed hopper of the injection molding machine such as by employing controlled rate-of- weight-loss feeders where the mixture is made in situ within the feed throat of the injection molding machine.

This invention enables the production of thinner (e.g., all the molded samples in the Examples section below are ⅛"(~3.2 mm) thick, the target thickness range for bipolar plates in fuel cells is about 1 to about 3 mm.), lighter, and lower cost conductive articles while significantly reducing or eliminating the need for the costly machining steps employed at the current state of the art. The articles of the invention exhibit volume resistivity of ca. $10^{-2}$ ohm-cm or less. In the preferred embodiment, current collectors having complex gas flow networks, highly suitable for use in fuel cells may be directly injection molded, requiring little or no finishing prior to use.

Reference is now made to the following specific embodiments for the purpose of illustrating the invention and for limiting same.

EXAMPLES

A description of the materials employed in the examples hereinbelow cited is provided in Table 1.

The nickel-coated graphite fibers were supplied in the form of 12,000 fiber pellets containing 5–15 wt-% of a low melting polyamide binder with a melting point 232° C. The fibers farther consisted of 60% by weight nickel and 25–35% by weight graphite. The fibers were provided in ¼" and ½" lengths.

Drying conditions applicable to the materials cited in the examples cited hereinbelow are as shown in Table 2.

TABLE 2

| | Drying Conditions | | |
|---|---|---|---|
| Material | Drying Temperature (° C.) | Duration at Temperature (hours) | Other |
| Zenite ® HX8000 | 105 | =12 | hopper dryer under N2 |
| Nickel-coated graphite fibers | 220 | =4 | oven dried under N2 |
| Thermocarb ® CF300 | — | — | used as received |
| Mesopitch Graphite Fibers | | | used as received |

In all examples injection molding was effected utilizing a 180 ton injection molding machine (Nissei Manufacturing, Nagano, Japan). The parts formed were 3"×6"×0.125" and 4"×4"×0.125" flat plaques.

All the volume resistivity measurements were done on the flat molded plaques using a four point probe (ref: "Electrical Resistivity Measurements of Polymer Materials" by A. R. Blythe in Polymer Testing 4 (1984) 195–200). Six (6) measurements were done on each side of the sample and the average of the measurement is reported as the volume conductivity number in the following examples.

Example 1

2730 g of HX8000 (dried at 105° C. for 12 hrs) was dry blended by tumbling with 910 g ach of ¼" and ½" long Nickel coated Graphite Fibers pellets. The blended mixture was injection molded at the following conditions.

TABLE 1

Description of Materials

| Name | Description | Manufacturer | Resin Melting Point | Product Form |
|---|---|---|---|---|
| Zenite ® HX8000 | Aromatic liquid crystalline Aromatic Polyester, | DuPont Company, Wilmington DE | ~240–260° C. | Resin pellets |
| PPI-1204-Ni60 and PPI-1208-Ni60 | Resin Impregnated Nickel-coated Graphite Fibers (with 60 w % nickel coating) | Composite Materials, LLC, Mamaronneck, NY USA | ~232° C. | ¼" and ½" fibers in pellet form- pellet diamter (~1/16")-12000 fibers per pellet (~7–8 micrometer), typical fiber aspect ratio - 300–1000 |
| PP1-1204-NiCu40 | Resin Impregnated Nickel-Copper Coated Graphite Fibers with ~35% copper and about 5% nickel | Composite Materials, LLC, Mamaronneck, NY USA | ~232° C. | ¼" and ½" fibers in pellet form- pellet diamter (~1/16")-12000 fibers per pellet (~7–8 micrometer), typical fiber aspect ratio - 300–1000 |
| Thermocarb ® CF300 | Graphite Powder | Conoco, Ponca City, OK USA | | Particle size 45–300 micrometer |
| Mesophase pitch- based graphite fiber | Graphite Fiber | Conoco, Ponca City, OK USA | | Fiber length ca. 1 mm |

| | |
|---|---|
| Melt Temperature: | 320° C. |
| Mold Temperature: | 30–70° C. |
| Injection pressure: | 703 kg/cm² |
| Injection speed: | 2.5–5 cm/sec |
| Screw Speed: | 50–75 RPM |
| Set Injection time (max): | 14 sec |
| Set Curing Time (max): | 18 sec |
| Set Cycle Start Time (max): | 1 sec |
| Back Pressure: | 0 kg/cm² |

The volume resistivity was found to be about $2.0 \times 10^{-3}$ ohm-cm.

Figure 2:
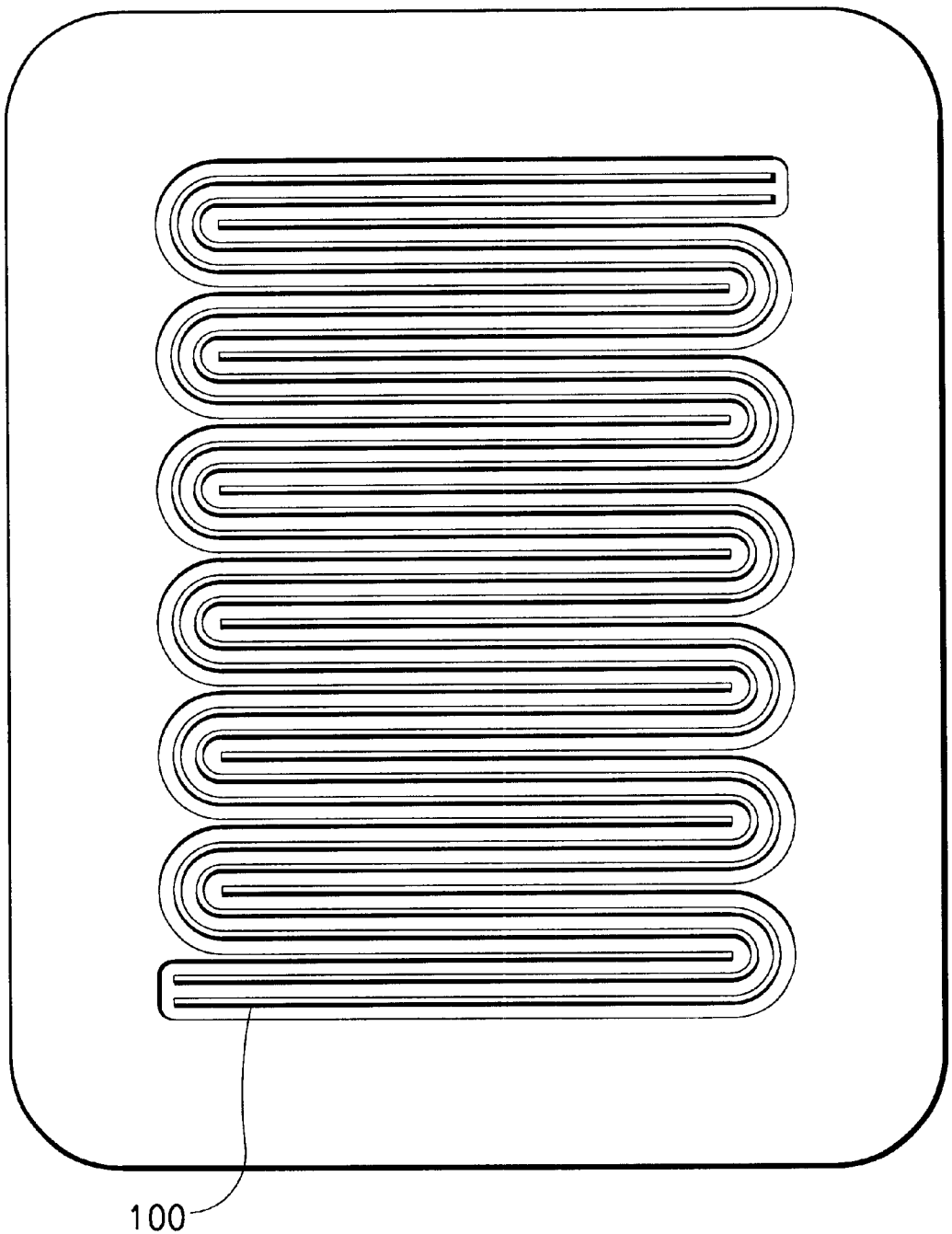
FIG. 2 is a schematic illustration of a molded bipolar plate with fluid distribution channels.

Reference is now made to FIG. 2 which shows a molded bipolar plate of Example 1 with fluid distribution channels, 100, molded therein.

Example 2

3185 g of HX8000 was dry blended with 682 g each of ¼" long and ½" long Nickel coated Graphite Fibers pellets. The blended mixture was injection molded at the following conditions.

| | |
|---|---|
| Melt Temperature: | 320° C. |
| Mold Temperature: | 80–87° C. |
| Injection pressure: | 492 kg/cm² |
| Injection speed: | 2.5–5 cm/sec (variable in cycle) |
| Screw Speed: | 50–75 RPM |
| Set Injection time (max): | 14 sec |
| Set Curing Time (max): | 18 sec. |
| Set Cycle Start Time (max): | 1 sec. |
| Back Pressure: | 0 kg/cm² |
| Shot Size: | 54% |

The volume resistivity was found to be about $1.0 \times 10^{-2}$ ohm-cm.

Comparative Example 1

2730 g of HX8000 and 6370 g of Thermocarb CF300 graphite Powder were melt compounded under vacuum in a Welding Engineers (King of Prussia, Pa.) 20 mm counter-rotating twin screw extruder. The polymer was fed into the first zone while the graphite was fed down stream after the polymer had melted. Screw speed was 125–150 rpm, and throughput was ca. 4550–6800 g. Die temperature was ca. 290–300° C. The extruded strand was chopped into ca. 0.125" pellets.

About 1360 g of formulation thus compounded was dryblended first with 910 g of additional HX8000 and then dry blended with 455 g each of ½" long and ¼" long Nickel Graphite Fibers pellets. The blended mixture was injection molded at the following conditions.

| | |
|---|---|
| Melt Temperature: | 320° C. |
| Mold Temperature: | 70–80° C. |
| Injection pressure: | 984 kg/cm² |
| Injection speed: | 2.5–5 cm/sec (variable in cycle) |
| Screw Speed: | 50–75 RPM |
| Set Injection time (max): | 14 sec |
| Set Curing Time (max): | 18 sec |
| Set Cycle Start Time (max): | 1 sec |
| Back Pressure: | 0 kg/cm² |

The volume resistivity was found to be about $2.5 \times 10^{-2}$ ohm-cm.

Comparative Example 2

2730 g dryblended HX8000 with 1820 g of Copper (on Nickel coating) coated (about 45 wt. % metal on fiber basis) graphite Fibers pellets. Each pellet contains 12000 fibers held together with a nylon proprietary based binder (5–15 wt %-fiber basis).

The blended mixture was injection molded at the following conditions.

| | |
|---|---|
| Melt Temperature: | 320° C. |
| Mold Temperature: | 70–76° C. |
| Injection pressure: | 703 kg/cm² |
| Injection speed: | 2.5–5 cm/sec |
| Screw Speed: | 50–75 RPM |
| Set Injection time (max): | 14 sec |
| Set Curing Time (max): | 18 sec |
| Set Cycle Start Time (max): | 1 sec |
| Back Pressure: | 0 kg/cm² |

The volume resistivity was found to be about $2.3 \times 10^{-2}$ ohm-cm.

Examples 3–6 and Comparative Examples 3–6

In Examples 3–6 and Comparative Examples 3–6 a comparison is drawn between the volume resistivity of flat plates molded from compositions comprising 3200 $\mu$m (0.125 inch) aromatic thermoplastic liquid crystalline resin pellets as received from the manufacturer, and compositions comprising 951 $\mu$m mean particle size cryogenically ground pellets.

The thermoplastic liquid crystalline resin powder was made by filling a 250 ml plastic beaker provided with holes in the bottom and fitted with a wire handle with ca. ⅛" (3.2 mm) resin pellets, followed by immersion of the thus filled beaker into a large bath of liquid nitrogen contained in a Dewar flask. The beaker was kept in the liquid nitrogen for a period of two minutes following the cessation of active boiling of the liquid nitrogen. An ABBE rotary cutter provided with a metal screen having holes 0.060" (1.5 mm) was started with the hopper slide closed. Wearing a face shield and thermally insulated gloves, the resin filled beaker was removed from the liquid nitrogen and its contents dumped into the feed hopper of the cutter. The slide was opened and the pellets fell into the blades. In any given run, only about 50% of the pellets fed were ground up. It was therefore necessary to stop every third or fourth run to clean out residual, now-warmed pellets and recycle them through the process.

Size determination were done using a laser diffraction method employing a Malvern Mastersizer X manufactured Malvern Instruments Ltd, Malvern, UK.

Whether powdered or in pellet form, the Zenite 8000 thermoplastic liquid crystalline resin (available in 3.2 mm pellets from DuPont, Wilmington, Del.) was dried for 12 hours at 105° C. under nitrogen.

In all cases a 180 ton injection molding machine (Nissei Mftg., Nagano, Japan) was employed to form plaques of dimensions 3"×6"×0.125" or 4"×4"×0.125".

Results are tabulated in Table 3.

Example 3

700 grams of the thermoplastic liquid crystalline resin powder was tumble-blended with 1300 grams of Thermocarb® CF300 graphite powder, the blend then fed immediately to the injection molding machine and molded under the following injection molding conditions:

| | |
|---|---|
| Melt Temperature | 320° C. |
| Mold Temperature | 150° C. |
| Injection Pressure | 1125 kg/cm$^2$ |
| Injection Speed | 5 cm/sec (variable in cycle) |
| Screw Speed | 125–140 RPM |
| Set Injection Time (max) | 30.0 sec. |
| Set Curing time (max) | 60.0 sec. |
| Set Cycle Start time (max) | 1 sec. |
| Back Pressure | 0 kg/cm$^2$ |
| Shot size | ~40–60%. |

Example 4

The materials and conditions of Example 3 were repeated except that 600 grams of thermoplastic liquid crystalline resin powder were combined with 1400 grams of Thermocarb® CF300.

Example 5

1050 grams of thermoplastic liquid crystalline resin powder was tumble blended with 1290 grams of Thermocarb® CF300 graphite powder and 660 grams of mesphase pitch based graphite fibers. The combination was fed immediately to an injection molding machine, and injection molded under the following injection molding conditions:

| | |
|---|---|
| Melt Temperature | 320° C. |
| Mold Temperature | 150° C. |
| Injection Pressure | 1335 kg/cm$^2$ |
| Injection Speed | 2.5–5 cm/sec (variable in cycle) |
| Screw Speed | 100–125 RPM |
| Set Injection Time (max) | 25.0 sec. |
| Set Curing time (max) | 45.0 sec. |
| Set Cycle Start time (max) | 1 sec. |
| Back Pressure | 0 kg/cm$^2$ |
| Shot size | ~40–60%. |

Example 6

The materials and procedures of Example 5 were employed except that 990 grams of the graphite fiber was employed.

Comparative Example 3

700 gms of dried Zenite 8000 pellets was dryblended by tumbling with 1300 µm of Thermocarb graphite powder CF300. The blended mixture was directly injection molded according to the following injection molding conditions:

| | |
|---|---|
| Melt Temperature | 320° C. |
| Mold Temperature | 150° C. |
| Injection Pressure | 1195 kg/cm$^2$ |
| Injection Speed | 2.5–5 cm/sec (variabie in cycle) |
| Screw Speed | 100–125 RPM |
| Set Injection Time (max) | 20.0 sec. |
| Set Curing time (max) | 30.0 sec. |
| Set Cycle Staat time (max) | 1 sec. |
| Back Pressure | 0 kg/cm$^2$ |
| Shot size | ~40–60%. |

Comparative Example 4

The materials and procedures of Comparative Example 3 were employed except that 600 grams of dried Zenite 8000 pellets was combined with 1400 grams of Thermocarb CF300.

Comparative Example 5

1050 gms of dried Zenite 8000 pellets was dryblended by tumbling with 1290 µm of Thermocarb graphite powder CF300 and 660 gm of pitch based graphite fibers. The blended mixture was injection molded under the following injection molding conditions:

| | |
|---|---|
| Melt Temperature | 320° C. |
| Mold Temperature | 150° C. |
| Injection Pressure | 1195 kg/cm$^2$ |
| Injection Speed | 2.5–5 cm/sec(variable in cycle) |
| Screw Speed | 100–125 RPM |
| Set Injection Time (max) | 20.0 sec. |
| Set Curing time (max) | 30.0 sec. |
| Set Cycle Start time (max) | 1 sec. |
| Back Pressure | 0 kg/cm$^2$ |
| Shot size | ~40–60%. |

Comparative Example 6

The materials and procedures of Comparative Example 5 were repeated except that 1050 grams of Zenite were combined with 990 grams of Thermocarb CF300 and 990 grams of pitch based graphite fibers.

TABLE 3

Volume Resistivity in Examples 4–8 and Comparative Examples 4–8

| Example | Vol. Resist (4 pt. Probe) ohm.cm |
|---|---|
| Ex. 3 | 0.18 |
| Comp. Ex. 3 | 0.21 |
| Ex. 4 | 0.12 |
| Comp. Ex. 4 | 0.15 |
| Ex. 5 | 0.18 |
| Comp. Ex. 5 | 0.27 |
| Ex. 6 | 0.18 |
| Comp. Ex. 6 | 0.32 |

It is claimed:

1. A process for fabricating a shaped article having a volume resistivity of less than $10^{-2}$ ohm-cm, the process comprising:

combining an injection moldable aromatic thermoplastic liquid crystalline polymer resin and a composition comprising nickel-coated graphite fibers impregnated with a non-liquid-crystalline thermoplastic binder resin, to form a mixture at a temperature below the melting point of the thermoplastic liquid crystalline polymer resin, the graphite fibers being of a length of less than 2 cm and comprising about 5 to about 50% by weight of the mixture, and the binder resin comprising about 0.1 to about 20% by weight of the graphite;

feeding the mixture to an injection molding machine wherein the thermoplastic liquid crystalline polymer resin is melted and fed in the molten state to a mold;

cooling the mold to a temperature at which the thermoplastic liquid crystalline polymer in the mixture no longer flows; and, removing the molded mixture from the mold.

2. The process of claim 1, wherein the nickel coated graphite fibers comprise about 10- about 40% by weight of the total composition.

3. The process of claim 1, wherein the nickel-coated graphite fibers are of a diameter in the range of about 5 to about 15 micrometers.

4. The process of claim 1, wherein the nickel-coated graphite fibers have a nickel-coating representing about 45% to about 60% of a total weight of the nickel-coated graphite fibers.

5. The process of claim 1, wherein the aromatic thermoplastic liquid crystalline polymer is a polyester or a poly(ester-amide).

6. The process of claim 5, wherein at least 50% of the bonds to ester or amide groups are to carbon atoms which are part of aromatic rings.

7. The process of claim 6, wherein at least 75% of the bonds to ester or amide groups are to carbon atoms which are part of aromatic rings.

8. The process of claim 1, wherein the binder resin comprises about 5% to about 15% by weight of the graphite.

9. A shaped article formed according to the process of claim 1.

10. The shaped article of claim 9 comprising a form of a bipolar plate.

11. The shaped article of claim 9 further comprising fluid distribution channels inscribed upon the surface thereof.

12. A shaped article having a volume resistivity of less than $10^{-2}$ ohm-cm comprising about 50 to about 95% by weight of a thermoplastic aromatic liquid crystalline polymer and about 5% to about 50% by weight of nickel-coated graphite fibers of a length less than 2 cm, and a non-liquid-crystalline thermoplastic resin at a concentration of about 0.1% to about 20% by weight with respect to the weight of the graphite.

13. The shaped article of claim 12, wherein the shaped article comprises about 10% to about 40% by weight of the nickel-coated graphite fiber.

14. The shaped article of claim 12, wherein the nickel-coated graphite fiber is of a diameter in the range of about 5 to about 15 micrometers.

15. The shaped article of claim 12, wherein the nickel-coating represents about 45 to about 60% of the total weight of e nickel-coated graphite fiber.

16. The shaped article of claim 12, wherein the aromatic thermoplastic liquid crystalline polymer is a polyester or a poly(ester-amide).

17. The shaped article of claim 16, wherein at least 50% of the bonds to ester or amide groups are to carbon atoms that are part of aromatic rings.

18. The shaped article of claim 17 wherein at least 75% of the bonds to ester or amide groups are to carbon atoms that are part of aromatic rings.

19. The shaped article of claim 12, wherein the binder resin comprises about 5% to about 15% by weight of the graphite.

20. The shaped article of claim 12, comprising a form of a bipolar plate.

21. The shaped article of claim 20, wherein the bipolar plate has a thickness in the range of about 0.1 to about 10 mm.

22. The shaped article of claim 21, wherein the bipolar plate thickness is in the range of about 1 to about 3 mm.

23. The shaped article of claim 20, further comprising fluid distribution channels inscribed upon the surface thereof.

* * * * *